(12) United States Patent
Ledet

(10) Patent No.: US 11,477,251 B1
(45) Date of Patent: *Oct. 18, 2022

(54) TRANSPORT COMMUNICATION

(71) Applicant: International Business Machines Corporation, Armonk, NY (US)

(72) Inventor: David Gerard Ledet, Allen, TX (US)

(73) Assignee: International Business Machines Corporation, Armonk, NY (US)

(*) Notice: Subject to any disclaimer, the term of this patent is extended or adjusted under 35 U.S.C. 154(b) by 139 days.

This patent is subject to a terminal disclaimer.

(21) Appl. No.: 17/159,125

(22) Filed: Jan. 26, 2021

Related U.S. Application Data

(63) Continuation of application No. 16/675,126, filed on Nov. 5, 2019, now Pat. No. 10,904,302, which is a continuation of application No. 14/155,514, filed on Jan. 15, 2014, now Pat. No. 10,469,548.

(51) Int. Cl.
| | |
|---|---|
| *H04L 65/403* | (2022.01) |
| *H04W 4/48* | (2018.01) |
| *H04W 4/46* | (2018.01) |
| *G06Q 50/30* | (2012.01) |

(52) U.S. Cl.
CPC ............ *H04L 65/403* (2013.01); *H04W 4/46* (2018.02); *H04W 4/48* (2018.02); *G06Q 50/30* (2013.01)

(58) Field of Classification Search
CPC ........ H04L 65/403; H04L 67/14; H04W 4/46; G06Q 50/30
See application file for complete search history.

(56) References Cited

U.S. PATENT DOCUMENTS

| | | | |
|---|---|---|---|
| 8,634,980 B1 | 1/2014 | Urmson et al. | |
| 9,036,509 B1* | 5/2015 | Addepalli | H04W 52/0206 701/1 |
| 2003/0186675 A1* | 10/2003 | Davis | H04W 4/026 455/39 |
| 2007/0061245 A1 | 3/2007 | Ramer et al. | |
| 2007/0061301 A1 | 3/2007 | Ramer et al. | |
| 2007/0063101 A1 | 3/2007 | Tiid et al. | |
| 2007/0083297 A1* | 4/2007 | Tengler | H04L 67/12 701/1 |
| 2009/0170434 A1* | 7/2009 | Tengler | H04L 67/14 455/41.2 |
| 2009/0231158 A1 | 9/2009 | Grigsby et al. | |
| 2009/0231432 A1* | 9/2009 | Grigsy | G08G 1/161 348/E9.006 |
| 2013/0238170 A1 | 9/2013 | Klinger | |
| 2013/0265857 A1 | 10/2013 | Foulds et al. | |
| 2013/0332528 A1* | 12/2013 | Olabinri | G06Q 99/00 709/204 |

(Continued)

*Primary Examiner* — William G Trost, IV
*Assistant Examiner* — Adam A Cooney

(57) ABSTRACT

A method, apparatus and non-transitory computer readable storage medium, in one embodiment, associating at least one autonomous transport and at least one user, determining at least one characteristic of said at least one user based on at least one of at least one user search history and at least one user preference selection, determining at least one user location of said at least one autonomous transport and querying at least one adjacent entity based at least on said determined at least one characteristic within a predetermined range of said at least one user location.

20 Claims, 8 Drawing Sheets

(56) References Cited

U.S. PATENT DOCUMENTS

2014/0247348 A1* 9/2014 Moore, Jr. ............ G06Q 10/101
　　　　　　　　　　　　　　　　　　　701/1
2014/0309868 A1　10/2014 Ricci
2015/0178034 A1　6/2015 Penilla et al.
2015/0185034 A1* 7/2015 Abhyanker ............ G06Q 50/01
　　　　　　　　　　　　　　　　　　　701/23

* cited by examiner

TRANSPORT COMMUNICATION

FIELD

The present disclosure generally involves autonomous transports, and more specifically the communication between autonomous transports, as well as examples surrounding the interface between a user and an autonomous transport.

BACKGROUND

Conventionally, users utilizing a transport do not have available directed attention to be able to interact with the transport and/or with information provided via the transport.

SUMMARY

In one embodiment, a method comprises at least one of: associating at least one autonomous transport and at least one user, determining at least one characteristic of said at least one user based on at least one of at least one user search history and at least one user preference selection, determining at least one user location of said at least one autonomous transport and querying at least one adjacent entity based at least on said determined at least one characteristic within a predetermined range of said at least one user location.

In another embodiment, an apparatus comprises at least one of: a processor configured to associate at least one autonomous transport and at least one user, determine at least one characteristic of said at least one user based on at least one of at least one user search history and at least one user preference selection and determine at least one user location of said at least one autonomous transport and receive a broadcast message of at least one adjacent entity based at least on said determined at least one characteristic within a predetermined range of said at least one user location.

In a further embodiment, a non-transitory computer readable storage medium configured to store instructions that when executed causes a processor to perform at least one of: associating at least one autonomous transport and at least one user, determining at least one characteristic of said at least one user based on at least one of at least one user search history and at least one user preference selection, determining at least one user location of said at least one autonomous transport, and querying at least one adjacent entity based at least on said determined at least one characteristic within a predetermined range of said at least one user location.

DETAILED DESCRIPTION

Figure 1:
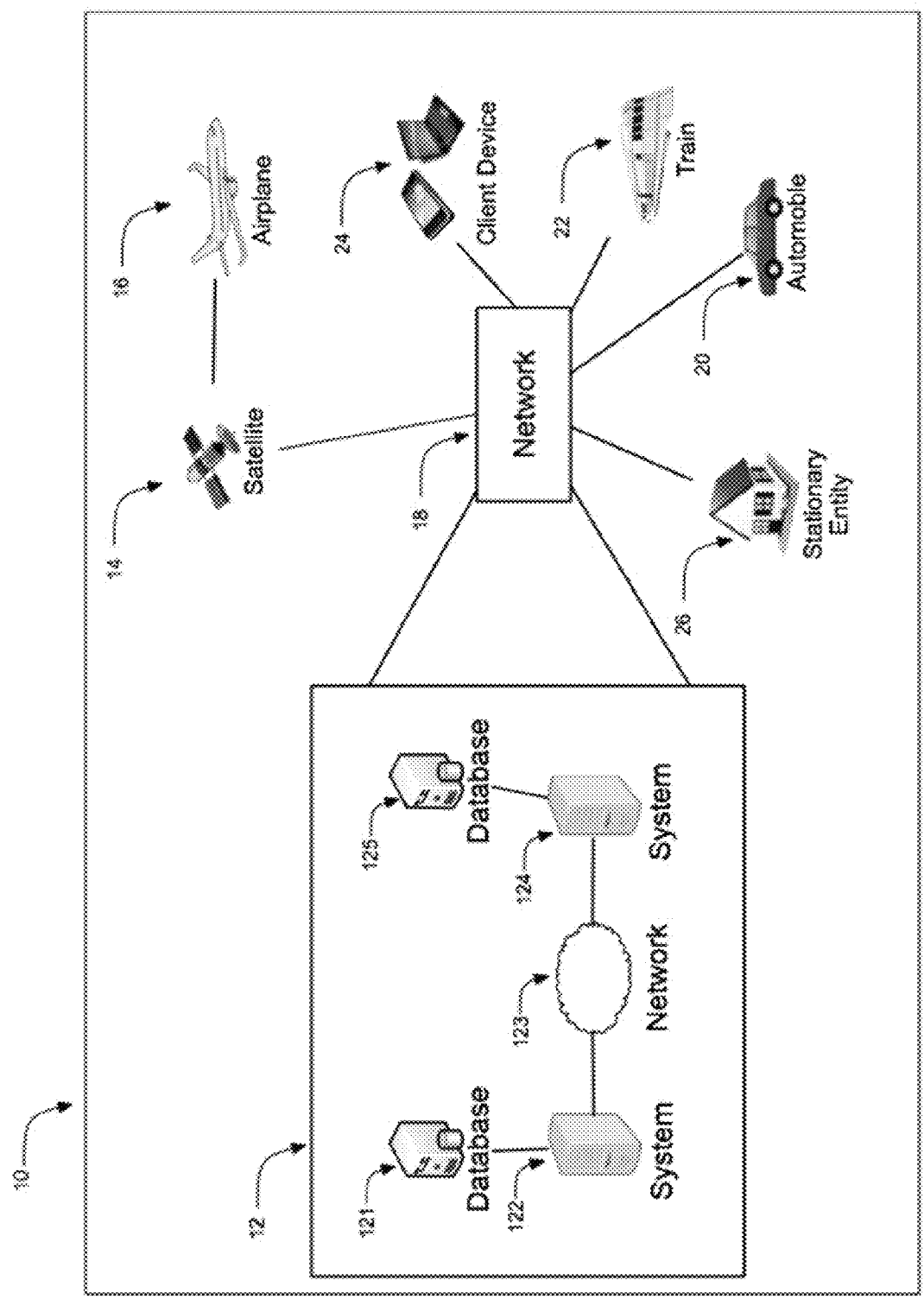
FIG. 1 illustrates an example transport communication system diagram, in accordance with one embodiment of the disclosure.

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example examples, some examples, or other similar language, throughout this specification refers to the fact that a particular feature, structure, or characteristic described in connection with the example may be included in at least one example of the present application. Thus, appearances of the phrases example examples, in some examples, in other examples, or other similar language, throughout this specification do not necessarily refer to the same group of examples, and the described features, structures, or characteristics may be combined in a suitable manner in one or more examples.

Example examples provide a wireless user device. The device may be a computer, laptop, mobile, wireless or cellular phone, a PDA, a tablet, a client, a server or a device that contains a processor and/or memory, whether that processor or memory performs a function related to an example. The present application discussed throughout the disclosure may work with a device, such as a personal computer with a touch screen, a laptop with a touch screen, a personal computing tablet, a smartphone or a device with a processor, memory and a touch screen.

The current disclosure allows interaction between a user device (such as a wired and/or wireless device) and a transport wherein a transport may be a car, bus, subway, train, motorcycle, bicycle, boat, plane, spaceship, submarine, or another object that may transport a human being and/or goods.

This interaction is intuitive in nature due to the transports', processor(s) and/or memory(ies) on the transport or off the transport and in communication with the transport, having knowledge of one or more of the passengers' or the user's interests, schedule, etc. and/or through specific knowledge of one or more of the transport's data stored which may be stored in at least on of: on the transport, on a device embedded in the transport, on a device used in the transport, and off of the transport (such as in the cloud).

The application, as referenced to in the current disclosure, resides on or in communication with the user's transport. The transport is considered a connected transport if it is a transport that is equipped with Internet access, including with a wireless local area Network (LAN). This disclosure allows the transport to share Internet access to devices inside and outside of the transport. Often, the transport is also equipped with technologies that provide additional functionalities to the user(s) of the transport. Increasingly, connected transports are taking advantage of the use of smartphones, and applications (apps) are available to interact with the car from a distance through the use of the Internet. Users are able to send remote signals from the Internet to unlock their cars, check the status of elements of the transport, find the location of the transport, remotely activate the climate control system of the transport, etc.

Interaction between a transport and a user may occur for various reasons. The transport, aware of specific aspects of the user, may offer suggestions according to various aspects of the trip to a given destination. For example, provide locations to the user that the user may find interesting and otherwise not be aware of.

The attention state of the user is calculated as determined by the amount of attention the user accords to the current state of the transport.

Examples depicted below establish the functionality allowing the transport to automatically respond to incoming data according to the profile of the user of the transport.

Further examples include into autonomous transports communicating with other entities. As transports become autonomous, there is similar advanced, intuitive technology incorporated into the transport allowing for transports to communicate with one another. As autonomous transports have cameras installed on the perimeters of the transport, these cameras are utilized for purposes outside of assisting the driverless transport. As these cameras or other hardware on the transport sense other transports nearby or other non-moving entities, communication between adjacent entities are established wherein specific information is exchanged.

In the U.S., driverless technologies may save tens of thousands of lives, prevent hundreds of thousands of injuries and avoid hundreds of billions of dollars in accident-related losses each year. Worldwide, driverless cars might significantly lower the 1.2 million fatalities and more than 50 million injuries caused by vehicular accidents each year.

Robotic cars may react faster than humans to avoid accidents, potentially saving thousands of lives. Transports may become a shared resource, a service that people may use. It is envisioned that with a tap on your smartphone, and an autonomous car may show up where you are.

The present disclosure illustrates specific examples surrounding communication between autonomous transports and other entities as well as intuitive applications allowing an autonomous transport to correspond with the user of the transport.

FIG. 1 depicts, in one example, a diagram of the present disclosure 10. The present disclosure allows a user utilizing an application currently executing on a transport, which includes one or more of (an Automobile 20, a Train 22, a Device 24, an Airplane 16 communicably coupled to a Satellite 14, and/or one or more of another transport that regularly or non-regularly transports human beings) henceforth referred to as a Transport. A user may also utilize an application currently executing on a Stationary Entity 26.

The Device 24 may be a mobile device or a more traditional computer such as a desktop, laptop, or may be a tablet computer, eBook reading device, mp3 player or such device with a processor, memory and display. The application (in the form of software, for example) may be downloaded from the Network 18 or that currently resides on the Transport and/or Device 24.

The elements in the system may include fewer or greater components or different components, such as wired or wireless electronic devices such as clients, servers, phones, tablets and computers as well as various Networks such as the Internet, intranets and public and private Networks.

The capability may be inherent in the Device 24, and/or the transport and/or a Stationary Entity 26 in the form of hardware, software, and/or firmware.

The Transport, Device 24, and the Stationary Entity 26 are connected to the Network 18. Other types of devices, in addition to devices depicted might be used with the present disclosure. For example, a PDA, a tablet computer, a laptop, an MP3 player, a gaming device (such as a hand held system or home based system) and the like (including a P.C. or other wired device) that may also transmit and receive information may be used with the present disclosure. The current application may work with a device such as a personal computer with a touch screen, a laptop with a touch screen, a personal computing tablet, a smartphone or a device with a processor, memory and a screen including a touch screen.

The user of the disclosure may interface with the Transport and/or Device 24 and/or the Stationary Entity 26 connected through the Network 18. The System 18 may be redundant, or be more than one entity.

The Network 18 is further comprised of a System 122 communicably coupled to the Network 123 and a Database 121. Also one or more System(s) 124 may be communicably coupled to the network 123 and a Database 125. The System 122 and/or 124 may be directly coupled with the Network 123 or connected remotely through the Network 16.

The application resides on the Transport and/or the Device 24, which may be a Transport and/or a mobile device, and may also reside on a user's desktop computer, a personal digital assistant (PDA), tablet computer, or another device containing a processor, memory, and an operating system. In addition, the application may reside on one of the other elements in the system depicted in FIG. 1; for example, the System 122/124, the Database 121/125, and/or the Network 123.

A Database 121/125 is directly connected to the System 122/124, may be a part of (co-located with the System 122/124) or connected remotely through the Network 123.

If the application resides on a Device 24, the application may be downloaded through a platform (such as an application store or market) residing on the device or accessed via the device.

The user interacts with the application executing on the Transport and/or the Device 24 via a pointing device, a computer keyboard, finger, hand, gesture, speech, eye or iris control or other commonly used input devices.

As autonomous transports become accepted by the market and become more popular, certain aspects of travel open as the transport's occupants no longer concentrate upon driving the transport. This opens up the opportunity to utilize technology to bring new interactions to the occupant.

For example, interactions with other transports become a more interesting scenario, as the occupant may communicate with other occupants in the same geographic location undistracted by driving the transport. Communication between the transport and other transports in near geographic vicinity are established through the current disclosure. This communication is sought by attempting a connection between the two transports, and once acknowledged, 2-way communication may be established wherein the two occupants may communicate via voice, text, and/or other communication avenues.

The current application may work with a device such as a personal computer with a touch screen, a laptop with a touch screen, a personal computing tablet, a smartphone or a device with a processor, memory and a screen including a touch screen.

Data that is utilized for applications is no longer stored on the same device executing the application (and certainly may be). The data may be stored remotely, or on the cloud (i.e. accessed and stored via and/or in the Network 16, which may be the Internet, or other data Network, not shown). In this configuration and this particular example, this data does not reside on a particular device, and resides external to the device. The data is obtained by a connection to the Network 16. As the separation of the application and its associated data grows, more and more applications store the associated data in the cloud, allowing access to data that is stored remotely through the connection to the Network 16. A benefit of this is that the same data is available selected devices.

By obtaining data through the cloud, a transport may determine certain intuitive observations that are depicted in detail below. This document serves to functionally examine particular scenarios to give the reader an understanding of the inherent functionality introduced through the current disclosure. Other intuitive applications may utilize a similar approach to the functionality introduced.

Today, more and more applications are utilizing the cloud (or the Network 16) to store data pertaining to a user and/or a device. These applications allow the storing and retrieval of an amount of data at a time with worldwide access. Application Programming Interfaces (APIs) are published wherein developers may obtain methods and procedures to take advantage of reliable and fast Networking infrastructure to perform data operations in a secure and cost effective manner.

Elements of cloud storage may comprise:
Projects: Data in the cloud storage exists inside a project. A project has a set of users, a set of APIs, billing, authentication and monitoring settings for the APIs.
Buckets: Buckets are the most basic element to hold data. Buckets may be utilized to organize data as well as control access to the data. Buckets belong to a project and they cannot be shared across projects.
Objects: Objects are individual elements of data that are stored in the cloud. They have two components: the object data and the object metadata. The object data component is usually a file that is stored in the cloud. The object metadata is a collection of elements in the form of [name-value] that describes the qualities of the objects. Objects belong to a bucket and cannot be shared among buckets.

Cloud storage provides functionalities and capabilities making storing, sharing and managing data efficient and reliable. Data may be terabytes in size. Cloud storage provides strong read-after-write performance for upload and deletion operations. This means that after an object is successfully uploaded, you may download it immediately, delete it, or get access to its metadata. Furthermore, by configuring the APIs, access to the data's objects and buckets are controlled. Data may be shared with the world, a particular group, by a specific domain, or users' with particular accounts.

The current disclosure relies on the storage of data in the cloud, and the transport and users device(s) having access to this data.

The more intuitive element of the current disclosure is based on the fact that the Transport 12 and/or the Device 14 understand certain aspects of the user. An understanding is accomplished by the Transport 12 and/or the Device 14 obtaining access to the cloud, thereby obtaining access to the System 18 and/or the Remote Systems 22 through the Network 16. The System and/or Remote Systems 22 collect and store certain information related to the user when interacting with devices that are connected to the cloud. The System 122 automatically understand historical and interests of the user by monitoring one or more of the following, and the like:
    advertisements that have been served to the user's and/or user's device such as an email program
    advertisements that the user accessed (such as lingered over, clicked on, etc.)
    searches requested
    web sites visited
    groups that the user is a member of
    emails that the user sent or received
    calendar events that the user is subscribed to
    Web surfing history
    previous and current location of the user
    time that certain actions occur
    online games that the user has shown interest in
    DVR (videos recorded and/or scheduled)
    live video streaming/IPTV
    web based shows
    GPS (Cellular)
    IP and/or mobile device records
    other data that a Remote System 22 may collect and provide access to via APIs For example, if the user performs one or more searches for Yard Work City State, the system may attempt to locate other transports in a similar geographic area that offer this service. In another example, the system may ascertain that the user is interested in obtaining a company for yard work based on the phone calls placed by the user or other data that reflects that the user is interested in obtaining yard work.

Among the various means to determine the interests of a given user, one of the beneficial methods is examining the user's search history. This search history is located in the user's computer (i.e. desktop, laptop, mobile device, or another device that contains a memory and processor, which is connected to the Network 16. Examining the user's Web searching history provides a window into what the user is interested in through an understanding how the user has utilized the Internet in the past.

When searching the Internet, the user will utilize a web browser. Upon visiting a website (or navigating to a Uniform Resource Locator (URL)), data may be stored on the user's device called a cookie. A cookie, also known as an HTTP cookie, web cookie, or browser cookie, is a piece of data sent from a website and stored in a user's web browser while a user is browsing a website. When the user browses the same website in the future, the data stored in the cookie is sent back to the website by the browser to notify the website of the user's previous activity. Cookies were designed to be a reliable mechanism for websites to remember the state of the website or activity the user had taken in the past. This may include clicking particular buttons, logging in, or a record of which pages were visited by the user.

Figure 2:
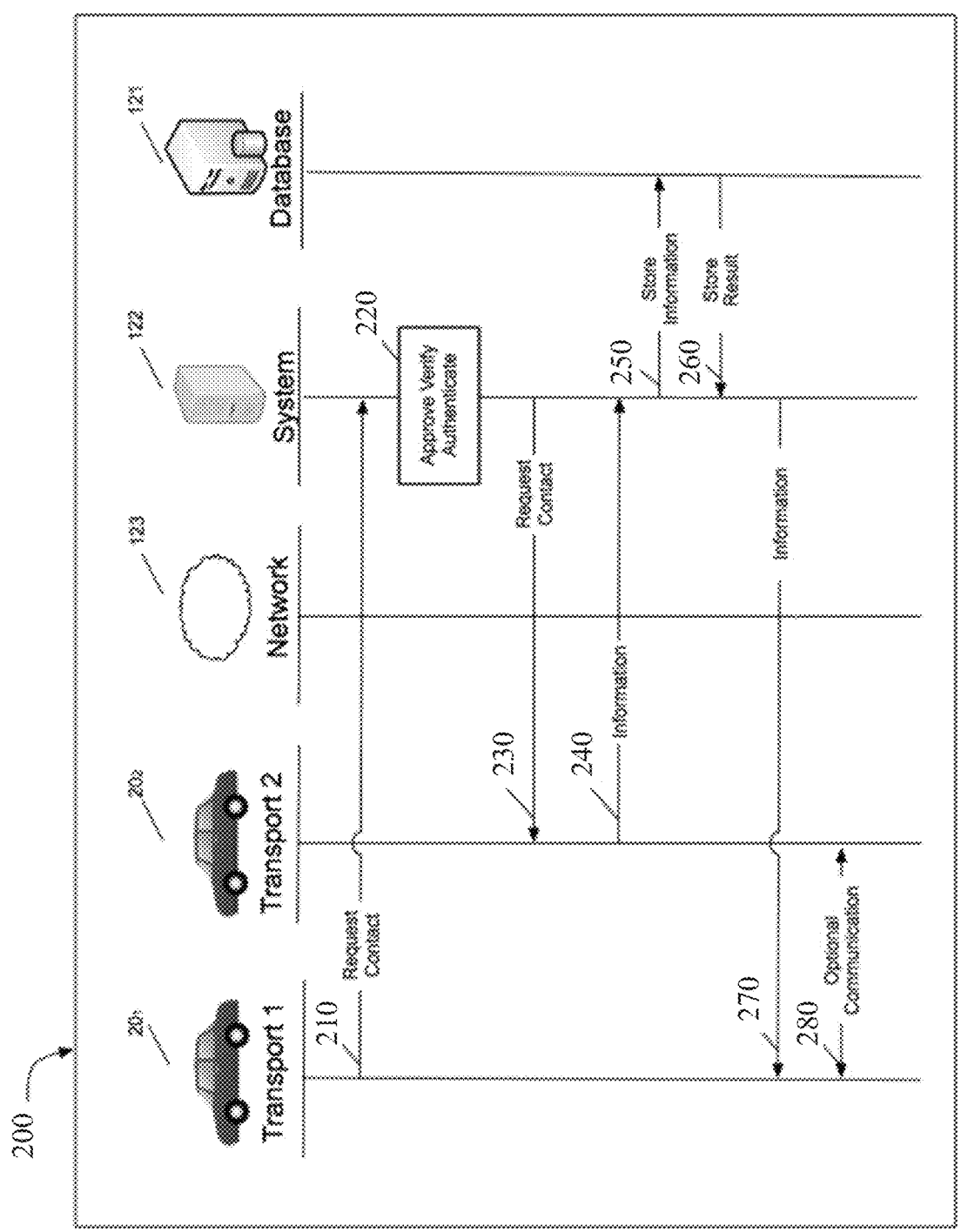
FIG. 2 illustrates an example of establishing communication between transports, in accordance with one embodiment of the disclosure.

FIG. 2 shows a possible implementation wherein the message flow between the current transport (Transport 1 201) and another transport in a near geographic location (Transport 2 202) is depicted 200. In this example, a Request Contact message 1010 is sent to the System 122. This message is routed to the System 122 through the Network 123 wherein the System contains the functional hub of the current disclosure. This hub may be one of the components in the Network 18 (the System 122/124 and/or the Database 121/125).

In one example, Transport 1 201 carries sensors including multiple radars mounted on the front and rear bumpers allowing the transport to see upcoming traffic as well as a camera positioned near the rear-view mirror and/or the rear of the transport locating the recording the surrounding area. These cameras locate other transports in the near geographic area wherein their location and distance are monitored.

The communication between the transports uses a 5.9 GHz bandwidth radio frequency, for example. This system allows communication with transports within 1000 feet radius of the transport. Other bandwidths and distances are possible.

Transport 1 201, understanding another Transport 2 202 is in the geographic location allows the user to establish communication between the two. The user in Transport 1 201 attempts to establish contact with Transport 2 202 by selecting Transport 2 202 on a touchscreen. This touchscreen presently displays surrounding transports, those that are in the same geographic location and those that are in the same geographic location and have opted in and are ready for communication. This opt in configuration is stored in the System 122 and is configured by the user of the transport at configuration time of the present disclosure. The configuration allows the user to specify the preferences allowing for communication with other transports. The configuration element(s) are sent to the System 122 and may be stored in the internal memory of that entity and/or stored in the connected Database 121.

Other functional procedures and methods may easily be programmed by software engineers describing the default configuration as well as the configuration of preferences as well as the methods of storing the configuration data in the system.

The transport may also carry other sensors, which include: radars mounted on the front and rear bumpers, that allow the car to see far enough to be able to deal with fast traffic on freeways; cameras, positioned near the rear-view mirror and the rear of the transport, that detects traffic lights; and a GPS, inertial measurement unit, and wheel encoder, that determine the transport's location and keep track of its movements.

The System 122, upon reception of the Request Contact message 101, executes a method on the System 122 which Approves, Verifies, and/or Authenticates the request 220.

The Approve/Verify/Authentication process involves determining the configuration preferences of the transport(s). The System 122 may obtain this information stored locally, or may query the Database 121 to determine the preference characteristics.

Assuming that Transport 2 202 is configured to accept the communication, the System 122 sends a Request Contact message 230 to Transport 2 202. This message is routed through the Network 123 and routed to Transport 2 202.

Transport 2 202 receives the incoming Request Contact message 1030 and may automatically respond by sending an Information message 1040 to the System 122.

In an alternate example, the user of Transport 2 202 may also be advised of a incoming communication request by alerting the user either by speech, text, a notification on a device viewable by the user or another method regularly utilized to notify a user of a transport an incoming message.

The System 122 stores the information in the Database 121 by sending a Store Information message 250 to the Database 121. In an alternate example, the information is stored locally in the System 122.

The Database 121 responds by sending a Store Result message 260 message to the System 122. This message may include a result value wherein the System may ascertain that the information was successfully stored in the Database 121.

The System 122 then sends the information received in the Information message 240 to Transport 1 201. This message is routed through the Network 123 to Transport 1 201.

At this point, Transport 1 201 and Transport 2 202 have established communication and messages 240, 250, 260, and 270 may be repeated. Also, information message(s) may be sent from Transport 1 201 to Transport 2 202 as well [not depicted].

In an alternate example, a direct connection between Transport 1 201 and Transport 2 202 may be established allowing the two transports to communicate directly. This optional communication is depicted by the Optional Communication message 280.

The current disclosure has the ability to broadcast messages that are current interest of the user of the disclosure. Transports in the near geographic area receive the broadcast message(s) and are able to respond with the System and/or the User.

For example, if the user were looking for someone to do yard work, the user enters that information into the system via a touchscreen on the transport, a device, or some other method utilized to input data into the system. The user enters what a request into the System 122, and the System 122 responds by attempting to locate transports that pertain to the data.

In another example, the System 22 retains information from the user as the data from or more activities are sent and stored in the System 22. The more intuitive element of the current disclosure is based on the fact that the Transport 201/202 and/or the Device 24 understand certain aspects of the user. The Transport 201/202 and/or the Device 24 obtaining access to the Network 18, thereby obtaining access to the System through the Network 18, accomplish an understanding. The System 22 collects and store certain information related to the user when interacting with devices that are connected to the Network 18.

Figure 3:
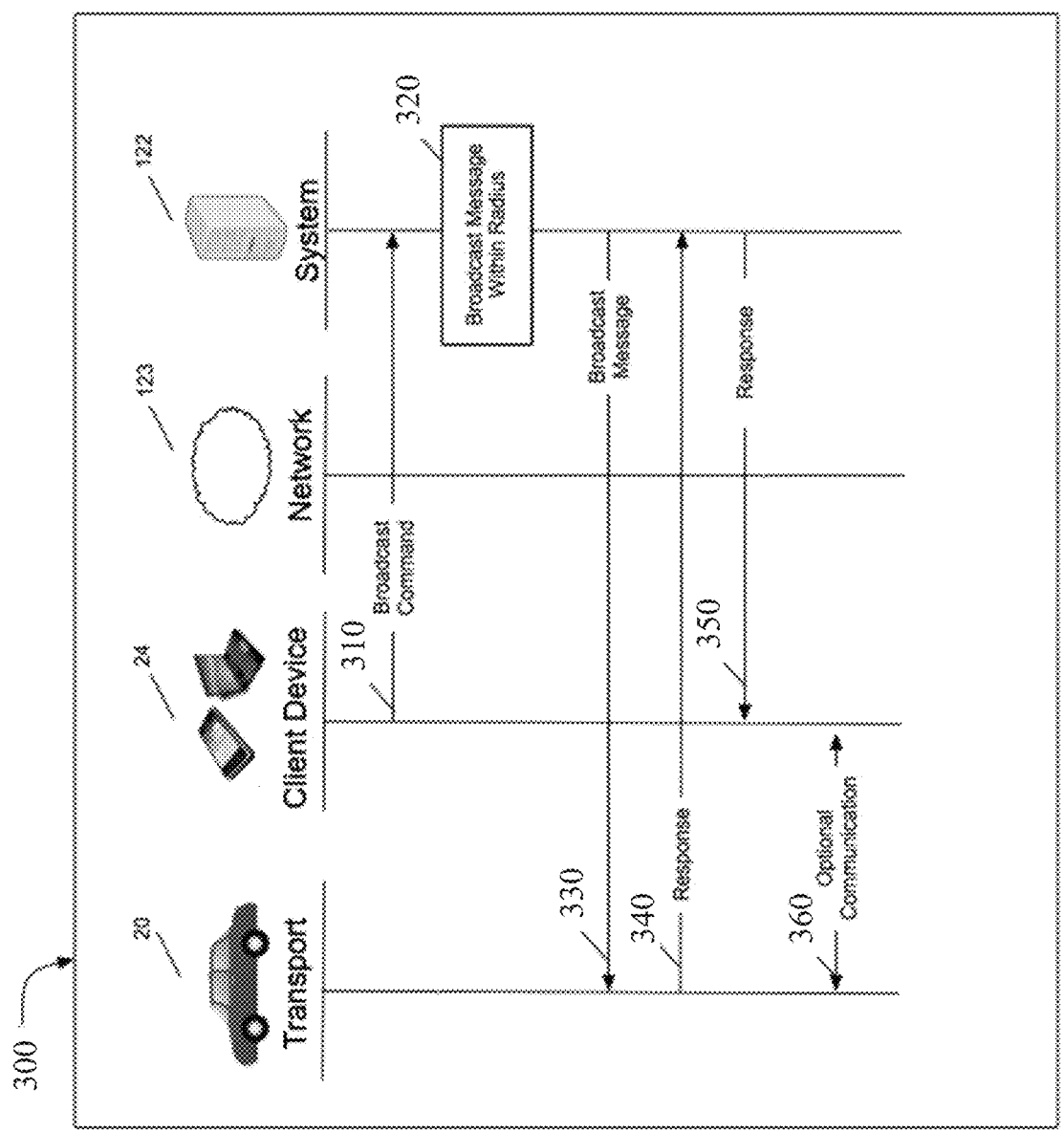
FIG. 3 illustrates an example of establishing communication between a transport and a device, in accordance with one embodiment of the disclosure.

FIG. 3 is a possible implementation wherein a message flow of the System 122 sends a broadcast message is depicted 300. In this scenario, the Device 24 determines that the user is seeking out a business by one of the elements. The Device 24 sends a Broadcast Command message 310 to the System 122. This message is routed through the Network 123 to the System 122.

The System 122, upon receiving the message, determines the radius to broadcast the message. The user configures this radius at configuration time wherein the user is able to input the preferences to the System or the radius is preconfigured and may be altered by the user. Further, different radii may be configured for different types of services. For example, a grocery delivery service may be configured with a small radius as perishables may be ordered. A car washing service that washes your car at your location may have a large radius. The Broadcast Message 330 is sent to Transport(s) 20 that are in the near geographic area of the Device 24. This message is sent to the Network 123 and is routed to the Transport 20. In other examples, the Device 24 is replaced by the Transport with the user.

The System 122 determines that a Transport 20 is affiliated with a service that is of interest to the user, understanding that the user has previously inquired of the said service.

For example, the System 122 determines that the user is interested in obtaining yard service, and understanding that Transport 20 is a Transport that is part of a business that offers yard service, and is in the near geographic area of the user.

The Transport 20, once receiving the Broadcast message 330 sends a Response message 340 to the System 122. This message is sent to the Network 123 and is routed to the System 122. This Response message contains information regarding details of the type of service that the business offers, for example. The information contained in the Response message 340 may contain other type of information.

In one example, the Transport and/or the Device 12/14 communicates with the System 18 in one or more of the following instances:
1. When the User utilizes the Transport and/or Device 12/14 with unspecified destination
2. When the User specifies a destination through the application of the current disclosure
3. When another user utilizes the Transport and/or the Device 12/14

In the first scenario above, the Transport and/or the Device 12/14 communicate with the System 18 wherein the Transport and/or the Device 12/14 may send information to the System 18 and/or the System 18 may send information to the Transport and/or Device 12/14. This may occur when the user is traveling to a destination.

The communication sent from the System 18 to the Transport and/or Device 12/14 contains information that may be of interest to the user of the current disclosure, information that is not requested. The current disclosure allows for the System 18 to have the insight through:
methods discussed in determining the characteristics of the user,
access to the Database 20 and the Remote System(s) 22, and
an understanding of the details of the travel of the user of the current disclosure, allowing intuitive communication.

In the second scenario above, the application residing on the Transport and/or Device 12/14 attempts to communicate with the System 18 when the user of the current disclosure specifically enters a destination into the application, for example, when the user is on a lengthy trip to a destination.

In the third scenario, the application residing on the Transport and/or the Device 12/14 may communicate with the System 18. This information may be limited in comparison to obtaining the full user's data, the System may communicate with the Transport and/or the Device 12/14.

In another example, the user of the application of the current disclosure enters configuration data into a form, henceforth referred to the configuration module of the application. This configuration module may be part of the application of the current disclosure executing on either the Transport 12 and/or the Device 14. The configuration module assists with configuring the System 18 with the defaults and preferences of the user, allowing the System 18 to more intuitively correspond with the user.

Figure 4:
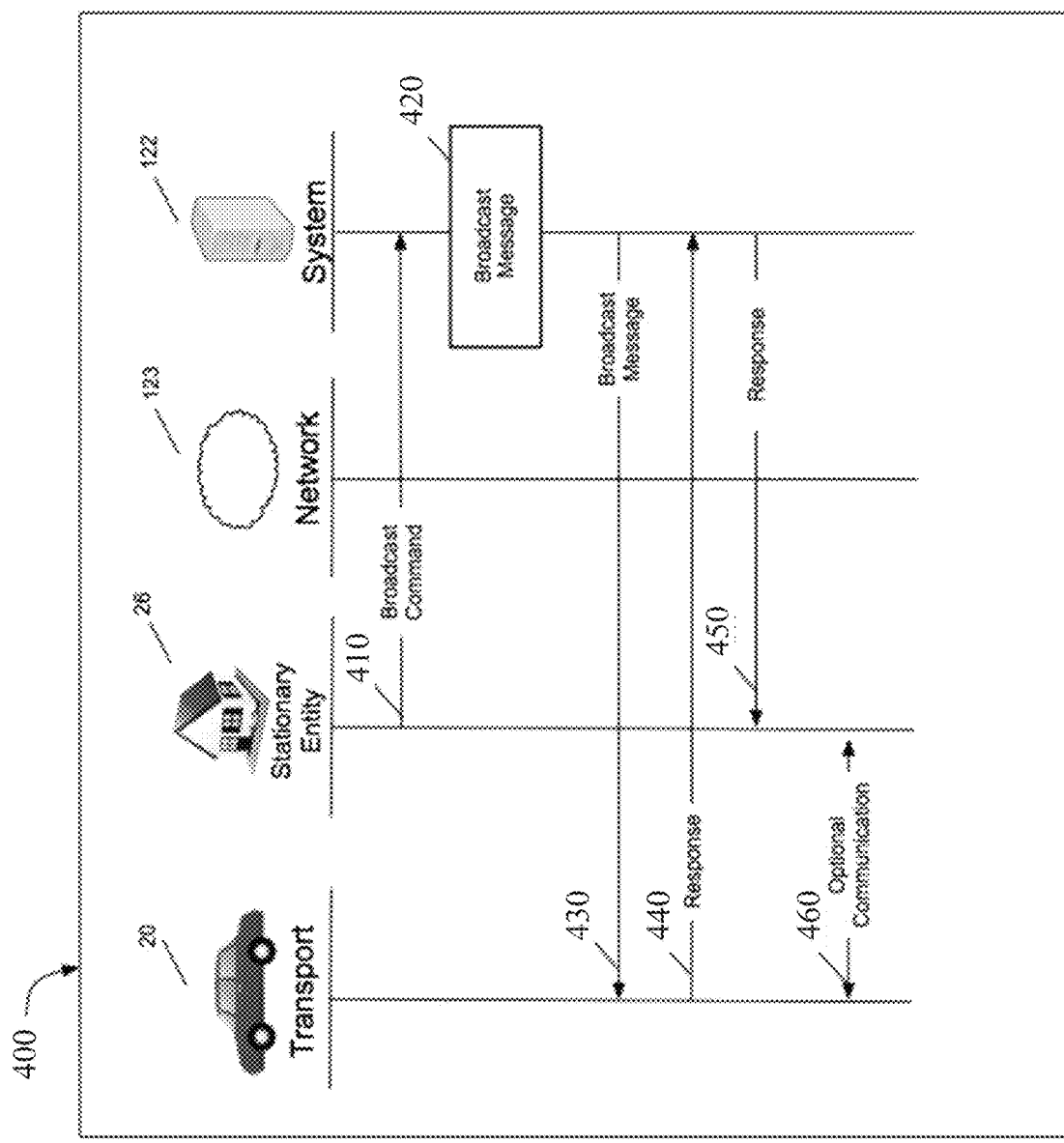
FIG. 4 illustrates an example of broadcasting a message from a stationary entity, in accordance with one embodiment of the disclosure.

FIG. 4 show a message flow of a possible implementation of a Stationary Entity 26 broadcasting a message 4000. The user associated with the Stationary Entity 26 initiates a broadcast message via a wired connection or a wireless connection (i.e. a wireless device). The information included in the Broadcast message may be entered in directly from the user, or the system may initiate the message automatically by obtaining information from the user. If the user inputs the information included in the Broadcast message, the application of the current disclosure may be used currently executing on a device, for example a mobile device. This application may be downloaded onto the device through an application store, or directly downloaded from the mobile device's access of the Internet, for example. Other methods of accessing the application on the device may be designed.

In one example, the broadcast message may be initiated from the device (i.e. a mobile device) associated in the same or similar geographic location of the Stationary Entity.

In another example, the broadcast message is sent from a transceiver in the same or similar geographic location of the Stationary Entity, or a similar device regularly used to transmit messages from a stationary location out to the Network.

The Stationary Entity 26 initiates a Broadcast Command message 410 that is routed through the Network 123 to the System 122.

The System 122, upon reception of the Broadcast Command message 410 determines the timeframe, the message contents, and information to send the message 420. The user may input the length of time that the broadcast message is sent out in a configuration element in the configuration portion of the application of the current disclosure. This activity occurs at the configuration procedure of the application. There is a default time set by the system (for example, seconds, minutes, hours, days, etc.) wherein the user may also accept the default time set by the system.

In another example, the Broadcast message 430 contains the amount of money that the user wishes to pay for the service. This allows prospective businesses receiving the broadcast message to respond if they agree with the amount offered for the service. This amount is entered by the user in the application of the current disclosure at the Stationary Entity 26, or on the Device of the user. A default dollar amount may be agreed upon at configuration time of the application. Other implementations of the method to input the amount offered for the service may be easily programmed.

In another example, the Broadcast message 430 contains a timeframe at the user wishes to have the service performed. This timeframe is included in the Broadcast message 430. This allows the prospective business receiving the broadcast message to respond if they agree with the timeframe offered for the service. This timeframe is entered by the user in the application of the current disclosure in a time component. This time component allows date ranges to be entered, as well as time of day preference.

The Broadcast message 430 is sent out from the System 122 for the predetermined amount of time. The broadcast message may be sent from by the entities (for example, the Stationary Entity 26, the System 122.

A Transport 20, which is in the near geographic location of the Stationary Entity 26 receives the broadcast message.

In another example, an entity may receive and respond to the broadcast message outside the designated geographic location. This entity may be determined by the System 122 as having an interest in the broadcast message and may receive the broadcast message due to its possible interest in the contents of the message.

The Transport 20 responds to the Broadcast message 430 by sending a Response message 440 to the System 122, routed through the Network 123. This message may contain information that the user inputs into the application. This information may be a response wherein the user wants to communicate with the originator of the broadcast message.

In another example, the information contained in the Response message 440 is automatically provided by the application.

The data in the Response message 440 is routed to the Stationary Entity 26 to complete the communication. At this point, the messages 430, 440, and 450 may be repeated [not depicted]. In addition, the Stationary Entity 26 may initiate messages once the Transport 20 is determined, sent through the System 122 directly to the Transport 20.

In an alternate example, a direct connection between Transport 20 and the Stationary Entity 26 may be established allowing the two entities to communicate directly. This optional communication is depicted by the Optional Communication message 460.

In another example, the Transport 20 arrives at the Stationary Entity 26 in response to the Broadcast message 430. Whether or not the user is present at the Stationary Entity 26, the System 122 allows the Transport 20 to provide a quote to the user via inherent functionality. In this example, messaging takes place between the Transport 20, the System 122, and the Stationary Entity 26 wherein specific information (for example, a quote for work to be performed, and/or other information regarding the business's website, contact information, a history of the business, Better Business Bureau reviews as well as other reviews, and another pertinent data that the user may find interesting and useful in obtaining service from the business.

This information is received at the Stationary Entity in the application currently executing on a device (for example a mobile device), a device containing a notification mechanism and a display, or another other device regularly utilized for display notifications.

In another example, the system allows the Transport 20 to provide a real-time video feed from a camera on the Transport 20. This video feed is fed to potential clients allowing the viewing of live video of the personnel performing a yard service. This video is routed through the Network 123 to the System 122, and finally to the Stationary Entity 26. There exists functionality on the application of the current disclosure displayed at the Stationary Entity 26 allowing the user to view the live video. This functionality is an indication on the user's display which may be a button or otherwise another component that initiates this functionality.

The System 123 forwards this information to the Device 24 by sending a Response message to the Device 24. This message is sent to the Network 123 and is routed to the Device 24.

In an alternate example, a direct connection between Transport 20 and the Device 24 may be established allowing the two entities to communicate directly. This optional communication is depicted by the Optional Communication message 1060.

Figure 5:
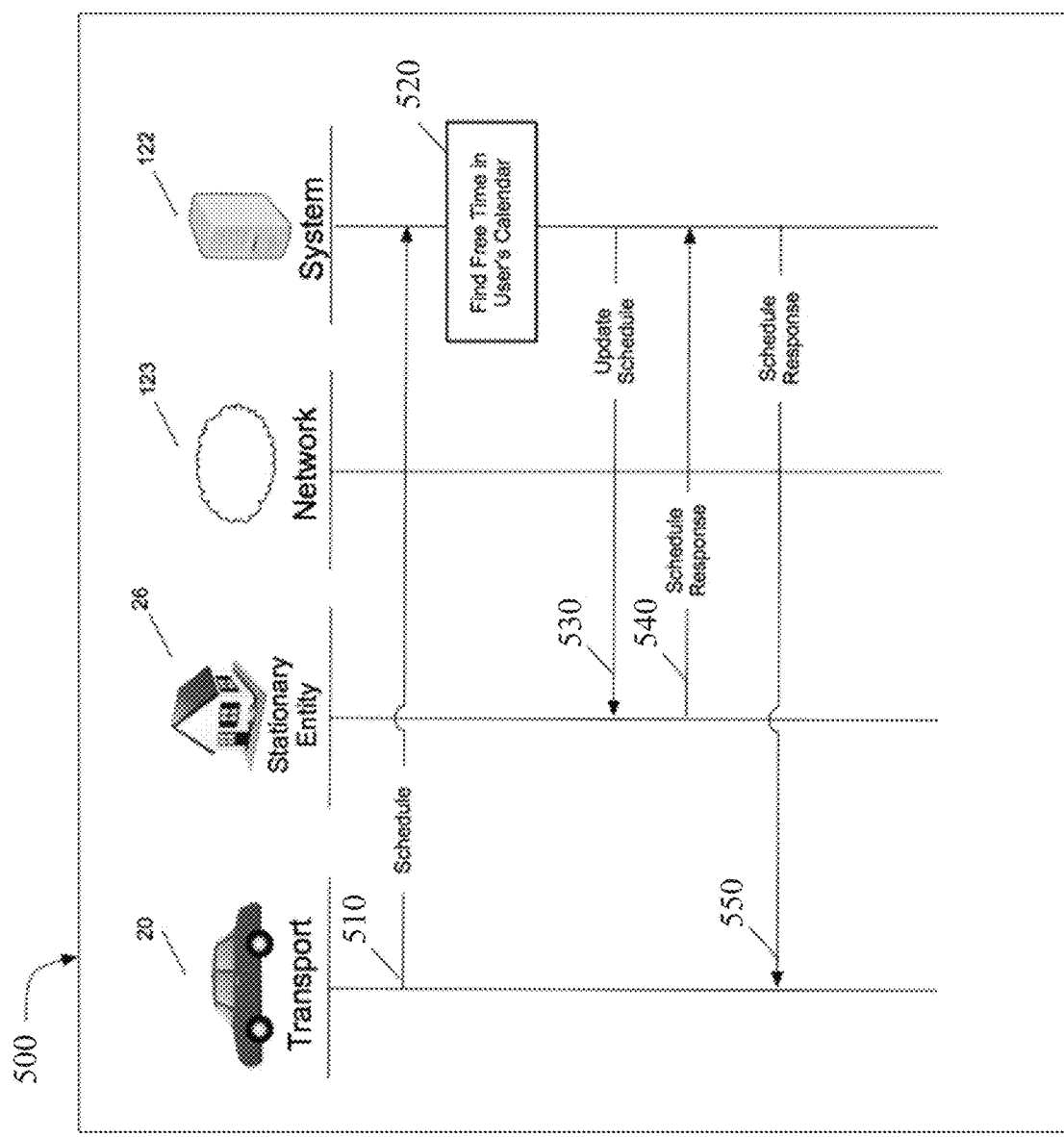
FIG. 5 illustrates an example of scheduling, in accordance with one embodiment of the disclosure.

In FIG. 5, the Transport 20 may request to schedule a job by sending a Schedule message 510 to the System 122. This message contains details on the job bid, the dates that are currently available and other pertinent data that the business may wish to send to the potential client. This message is sent to the Network 123 and is routed to the System 122.

The System 122, upon receiving the Schedule message 510, obtains the user's current calendar schedule 520. The System 122 compares the data in the Schedule message 510 and determines what the most appropriate day to schedule the job for. This functionality compares the dates in the incoming Schedule message 510 with the dates in the user's calendar, determining the free time wherein there is an opening in the user's calendar data.

In one example, the System 123 informs the user of a schedule update by sending an Update Schedule 530 message to the user. This message is sent to the application located at Stationary Entity 26 through the Network 123, and/or sent to the application residing on the user's device.

The user has the option to either accept or deny the schedule change by interacting with the application executing on the device. Upon input from the user, a Schedule Response message 540 is sent to the System 122, routed through the Network 123. Upon reception of the Schedule Response message 540 the system synchronizes the calendar of the user.

Finally, the Schedule Response message is sent to the Transport 20 to allow the communication to be completed and allow Transport 20 to be made aware of the finalized schedule.

A stationary entity, for example a house or a place of business, may broadcast out messages wherein transports may receive the broadcast. In this scenario, the message is sent out to transports and may receive notification of an incoming message via broadcast. They may take actions including communicating with the entity broadcasting the message.

For example, a person may broadcast a message such as I need help grocery shopping from their house. This message may be broadcast out from their home. A passing transport may receive this message and may respond to the broadcast message via the application of the current disclosure.

There are ma elements of this example that allows user to find others people to assist them in their needs, or sell items easily, or another such implementation.

In another example, the system allows users to connect with one another if they are in the same or near geographic vicinity. For example, the user is in a transport which, when passing by a Stationary Entity (for example, a business) receives a broadcast message that the business has a camera for sale. The system, acknowledging that the user is in the market to purchase a camera brings this broadcast message to the user's attention by delivering the message to the user's transport and/or the user's Device. The user, understanding that the transport is near the business has the opportunity to either respond to the broadcast message via the application as previously depicted, or may visit the business due to the current close proximity. This scenario assumes that the parties are users of the application and have opted into a privacy agreement.

In another example, we assume that the user is currently broadcasting an résumé, for example. The broadcast is sent out from the transport wherein the user is currently residing. Therefore, if the user were passing a business that has opted into the application, they may receive the broadcast message and have the opportunity to correspond with the user through functionality depicted above.

Now let us assume that the user continues moving from the business and onto the airport wherein an airplane is next used for travel. The system may continue to notify you of responses to the broadcast message and it may know geographically where the user is currently located. Therefore, if the user is geographically in the same or similar area as the entity responding to the broadcast message, there are additional functionalities that are included in this scenario.

For example, if the two users are near one another, in addition to the notification of the response to the broadcast, the system also includes this data, for example: The connecting party is 2 miles from your current location. This added note allows the user to decide if a face-to-face meeting is possible at the time of the broadcast response.

A response to the broadcast message may be received by the application currently residing at the Stationary Entity, or a device. If on the device (for example a mobile device), the response is received by a notification sent by the system through the network and finally delivered to the mobile device and displayed in the application of the current disclosure executing on the mobile device. If the response is received by the Stationary Entity, then a device communicably coupled to the Internet receives the response and notifies the user via the application of the current disclosure executing on the device.

In summary, the system broadcasts (for example) a notice that the user is seeking to purchase a video camera. This broadcast goes out from the transport that is currently being utilized. As the user receives responses to the broadcast message, if the user is near the business or person selling the video camera, it may give this information in addition to the other response data to allow the user to have the option to connect with the other party.

In another example, broadcast messages are sent out from the application and/or transport when the user is in an airplane. For a plane, a satellite sends signal to a transmitter on the ground, which is communicatively coupled to the Internet, which may send the signal to different web sites as well as communicatively coupled to a wireless network, which may send the signal to the surrounding area. That signal (which may be the user's resume) may be picked up by other transports or stationary objects which may be looking to hire, billboards advertising services they are looking for, etc. As the plane moves and the user's signal traverses different cell sites, the signal is broadcast to similar end-points in different cities, states, countries, etc.

As a user travels, the system is made aware of the location of the user through the user's mobile device, which is communicatively coupled to the Internet, or through a device on the user's Transport. The system is looking for signals and responses to a broadcast message from users in the system. Anytime there is a match, the user may be made aware and in addition, let the user know if the two parties are nearby. It is well understood that, due to privacy concerns, parties utilizing the functionality in the application may or may not have previously signed up for the application and have opted in to the privacy statements.

In some scenarios, the transport is temporarily stationary. For example a moving truck that is in motion to a job, then stops to perform the job. In this example, either the moving truck (transport) and/or the user (via a Device) may send out a broadcast message that mentions temporary help is being sought out.

The broadcast message may be sent out in the geographic vicinity of where the job is located; therefore users of the system in the same geographic location may be able to receive the broadcast message.

The broadcast message may contain specific information as to the nature of the job; for example the time when the job expires, the pay, pictures of the contents of the truck to unload, or pictures of the house to load, etc.

Users are able to respond to the broadcast message wherein the user of the application is notified and a connection may be made to connect the two parties.

Figure 6:
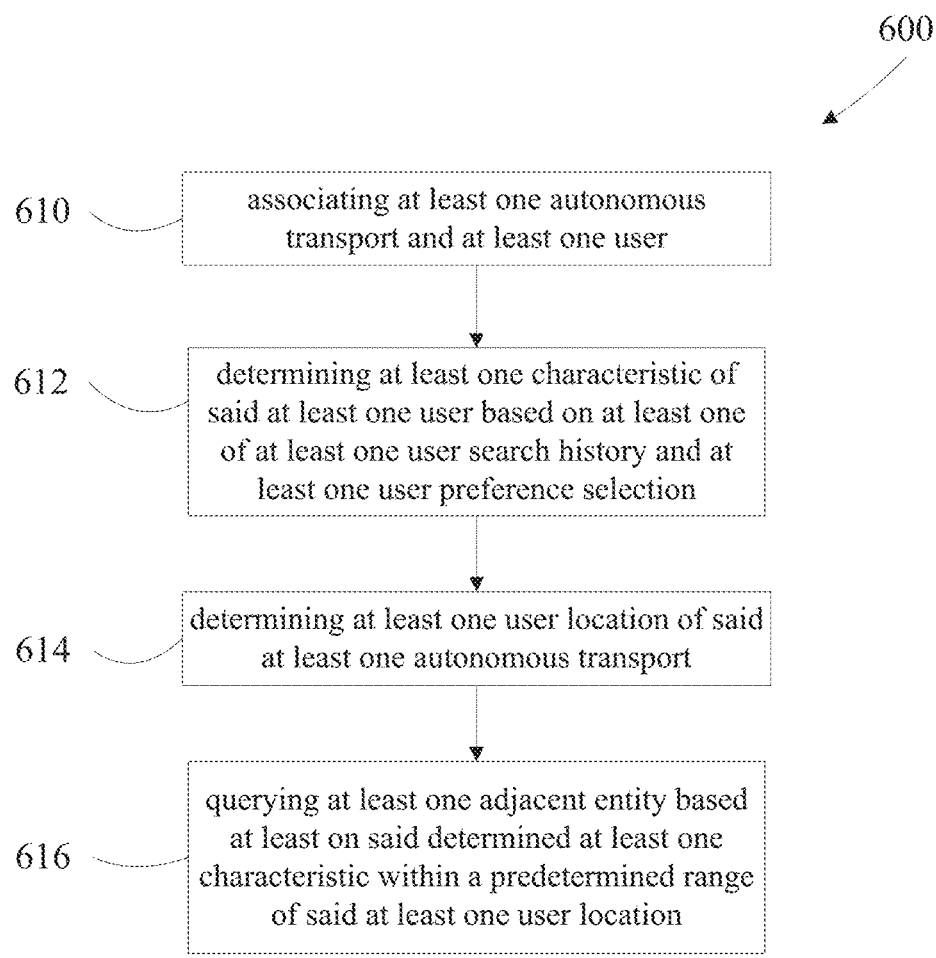
FIG. 6 illustrates a first example of transport communication method, in accordance with one embodiment of the disclosure.

FIG. 6 shows and describes a method 600, comprising; associating 610 at least one autonomous transport and at least one user and determining 612 at least one characteristic of the at least one user based on at least one of at least one user search history and at least one user preference selection. The method also comprises determining 614 at least one user location of the at least one autonomous transport and querying 616 at least one adjacent entity based at least on the determined at least one characteristic within a predetermined range of the at least one user location.

The computer implemented method of FIG. 6 may additionally have the at least one adjacent entity is at least one adjacent transport, at least one adjacent stationary entity or at least one adjacent wireless device. The method may further comprise querying at least one adjacent entity is based at least on a broadcast message, determining at least one user location is based on at least one of at least one global position satellite location and at least one cell tower location. The method may further comprise approving communication, verifying communication and or authenticating communication with the at least one adjacent entity. The method may further comprise scheduling based at least on the query.

Figure 7:
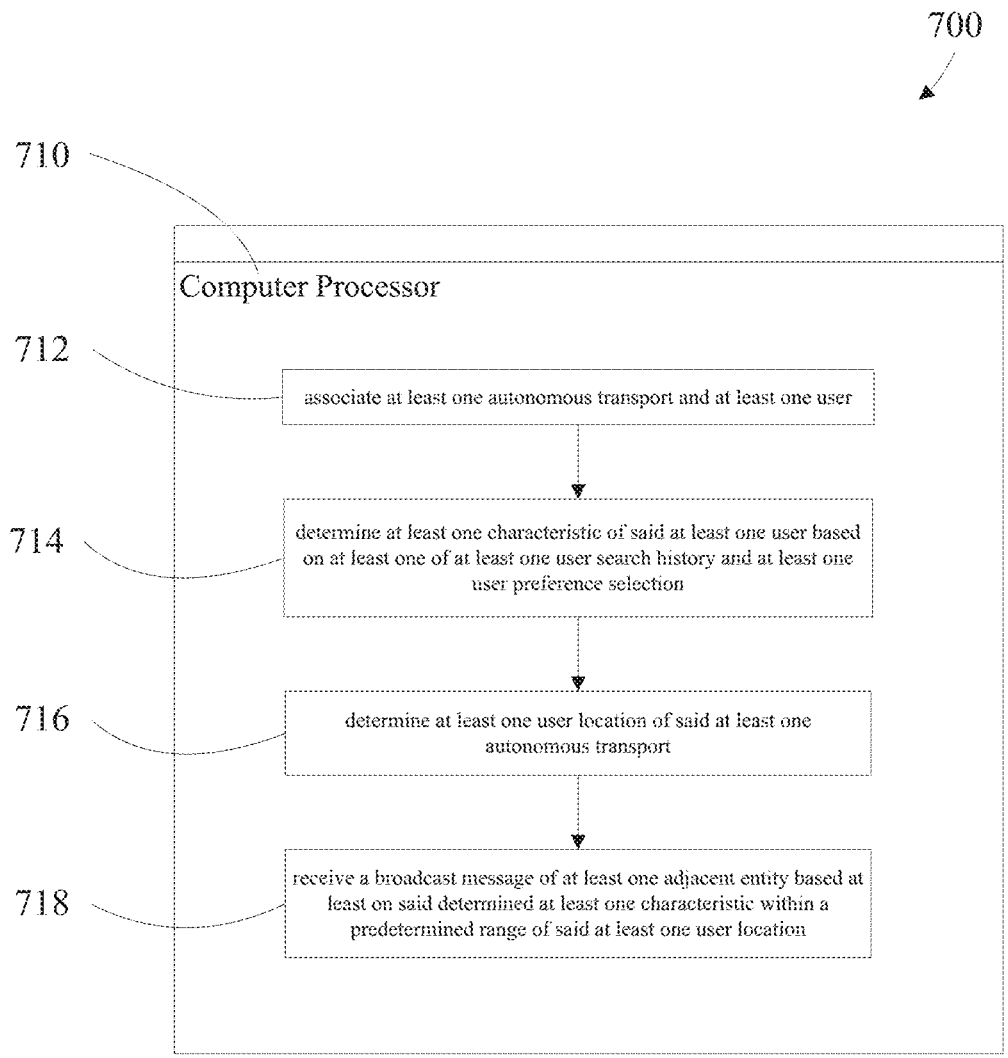
FIG. 7 illustrates a second example of transport communication apparatus, in accordance with one embodiment of the disclosure.

FIG. 7 shows and describes an apparatus 700, comprising; a processor 710 configured to associate 712 at least one autonomous transport and at least one user and determine 714 at least one characteristic of the at least one user based on at least one of at least one user search history and at least one user preference selection. The processor is also configured to determine 716 at least one user location of the at least one autonomous transport and receive 718 a broadcast message of at least one adjacent entity based at least on the determined at least one characteristic within a predetermined range of the at least one user location.

The apparatus of FIG. 7 may also configure the processor to analyze the at least one user search history to determine at least one of at least one user hobby, at least one user sport, at least one user group and at least one user interest, record at least one user search history and determine a routing schedule based on at least one of at least one route history and at least one input destination.

Figure 8:
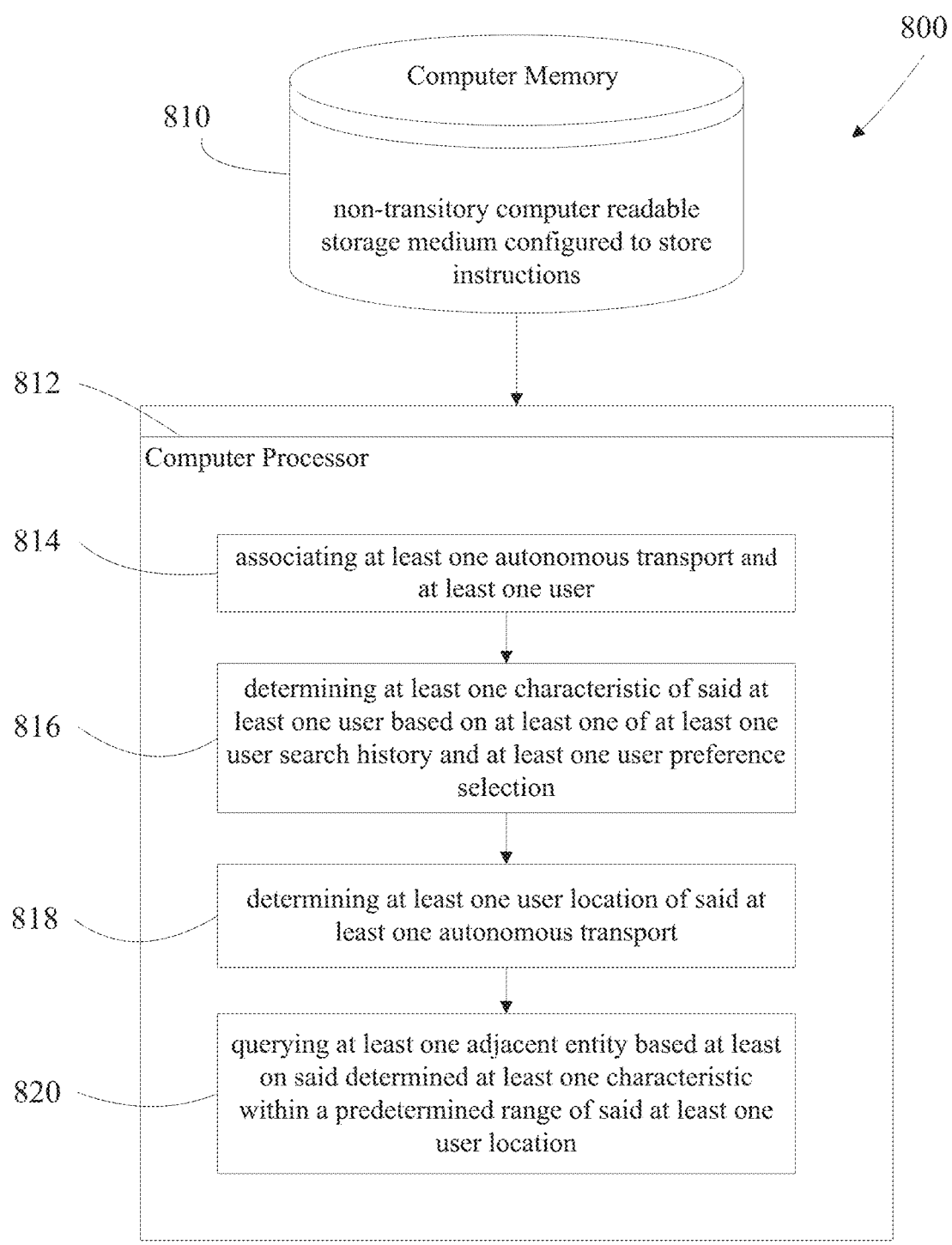
FIG. 8 illustrates a third example of transport communication computer readable medium, in accordance with one embodiment of the disclosure.

FIG. 8 shows and describes a non-transitory computer readable storage medium 810 configured to store instructions that when executed causes a processor 812 to perform; associating 814 at least one autonomous transport and at least one user and determining 816 at least one characteristic of the at least one user based on at least one of at least one user search history and at least one user preference selection. The processor instructions also comprise determining 818 at least one user location of the at least one autonomous transport, and querying 820 at least one adjacent entity based at least on the determined at least one characteristic within a predetermined range of the at least one user location.

FIG. 8 may also comprise recording at least one user search history, and analyzing the at least one user search history to determine at least one of at least one user hobby, at least one user sport, at least one user group and at least one user interest. The method may further comprise approving communication, verifying communication and or authenticating communication with the at least one adjacent entity.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components, for example a network element, which may represent network components.

Although an exemplary example of the system, method, and computer readable medium of the present disclosure has been illustrated in the accompanied drawings and described in the foregoing detailed description, it may be understood that the disclosure is not limited to the examples disclosed, and is capable of numerous rearrangements, modifications, and substitutions without departing from the spirit or scope of the disclosure as set forth and defined by the following claims. For example, the capabilities of the systems may be performed by one or more of the modules or components described herein or in a distributed architecture. For example, the functionality performed by the individual modules, may be performed by one or more of these modules. Further, the functionality described herein may be performed at various times and in relation to various events, internal or external to the modules or components. Also, the information sent between various modules may be sent between the modules via at least one of: a data network, the Internet, a voice network, an Internet Protocol network, a wireless device, a wired device and/or via plurality of protocols. Also, the messages sent or received by module and may be sent or received directly and/or via one or more of the other modules.

While preferred examples of the present application have been described, it is to be understood that the examples described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, by an autonomous transport, web content of a device of associated with a user;
   detecting at least one adjacent autonomous transport that is unknown to the user and that is determined to be of interest to the user based on the received web content, wherein the at least one adjacent autonomous transport is within a predetermined range of a location of the autonomous transport, and has opted in for two-way communication with other unknown users associated with the determined interest;
   establishing an Internet channel between network equipment of the autonomous transport and network equipment of the at least one adjacent autonomous transport via an Internet network system; and
   transmitting, via the established Internet channel, a query to the at least one adjacent autonomous transport.

2. The method of claim 1, wherein the receiving comprises accessing the web content by the autonomous transport via an application programming interface of a network cloud storage storing the web content from the device.

3. The method of claim 1 wherein the query is transmitted to the at least one detected adjacent autonomous transport via a broadcast message.

4. The method of claim 1 wherein the determining the location of the autonomous transport is based on at least one of a global position satellite location and a cell tower location.

5. The method of claim 1 further comprising approving communication with said at least one detected adjacent autonomous transport.

6. The method of claim 1 further comprising authenticating communication with said at least one detected adjacent autonomous transport.

7. The method of claim 1, further comprising transmitting a scheduling request based on said query to at least one communication device of the at least one detected adjacent autonomous transport.

8. The method of claim 1, wherein the interest of the user comprises an item for purchase, and the transmitting the query comprises generating and transmitting a request to purchase the item from the detected at least one adjacent autonomous transport.

9. The method of claim 1, wherein each adjacent autonomous transport that is of interest of the user is detectable to the autonomous transport in response to the adjacent autonomous transport executing a common application as the autonomous transport and configuring the common application to establish two-way communication with unknown users associated with the interest.

10. The method of claim 1, further comprising changing from the established Internet channel to a dedicated short range communication channel between the autonomous transport and the at least one adjacent autonomous transport to enable direct communication between the autonomous transport and the at least one adjacent autonomous transport.

11. The method of claim 1, wherein the receiving comprises receiving the interest of the user, via the API, from one or more of web searches requested by the user and emails that the user has previously sent or received.

12. An apparatus, comprising:
    a processor configured to
      receive, by an autonomous transport, web content associated with a user;
      detect at least one adjacent autonomous transport that is unknown to the user and that is determined to be of interest to the user based on the received web content, wherein the at least one adjacent autonomous transport is within a predetermined range of a location of the autonomous transport and has opted in for two-way communication with other unknown users associated with the determined interest; and
    a transmitter configured to
      establish an Internet channel between network equipment of the autonomous transport and network equipment of the at least one adjacent autonomous transport via an Internet network system;
    wherein the processor is configured to transmit, via the established Internet channel, a query to the at least one adjacent autonomous transport.

13. The apparatus of claim 12, wherein said processor further analyzes at least one user search history to determine at least one user hobby, user sport, and user group, as the interest of the user.

14. The apparatus of claim 12, wherein said processor further records at least one user search history.

15. The apparatus of claim 12, wherein the receives comprises accessing the web content by the autonomous transport via an application programming interface (API) of a network cloud storage storing the web content from the device.

16. The apparatus of claim 12, wherein said processor further determines a route schedule based on a schedule and at least one of at least one route history and at least one input destination.

17. A non-transitory computer readable storage medium configured to store instructions that when executed causes a processor to perform:
   receiving, by an autonomous transport, web content associated with a user;
   detecting at least one adjacent autonomous transport that is unknown to the user and that is determined to be of interest to the user based on the received web content, wherein the at least one adjacent autonomous transport is within a predetermined range of a location of the autonomous transport, and has opted in for two-way communication with other unknown users associated with the determined interest;
   establishing an Internet channel between network equipment of the autonomous transport and network equipment of the at least one adjacent autonomous transport via an Internet network system; and
   transmitting, via the established Internet channel, a query to the at least one adjacent autonomous transport.

18. The non-transitory computer readable storage medium of claim 17, wherein the processor is further configured to perform:
   recording at least one user search history; and
   analyzing said at least one user search history to determine at least one user hobby, user sport, and user group, as the interest of the user.

19. The non-transitory computer readable storage medium of claim 17, further comprising approving communication with said at least one detected adjacent autonomous transport.

20. The non-transitory computer readable storage medium of claim 17, further comprising authenticating communication with said at least one detected adjacent autonomous transport.

\* \* \* \* \*